US011600408B2

(12) United States Patent
Zhao et al.

(10) Patent No.: US 11,600,408 B2
(45) Date of Patent: Mar. 7, 2023

(54) METHOD FOR IMPROVING CURRENT CARRYING CAPACITY OF SECOND-GENERATION HIGH-TEMPERATURE SUPERCONDUCTING TAPE

(71) Applicant: Shanghai Jiao Tong University, Shanghai (CN)

(72) Inventors: Yue Zhao, Shanghai (CN); Jingyuan Chu, Shanghai (CN); Zhijian Jin, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 727 days.

(21) Appl. No.: 16/558,013

(22) Filed: Aug. 30, 2019

(65) Prior Publication Data
US 2021/0065937 A1    Mar. 4, 2021

(51) Int. Cl.
*H01B 12/02*    (2006.01)
*C04B 40/02*    (2006.01)

(52) U.S. Cl.
CPC .............. *H01B 12/02* (2013.01); *C04B 40/02* (2013.01); *C04B 2235/6583* (2013.01)

(58) Field of Classification Search
CPC ......... Y10T 29/49014; Y10T 428/2958; Y10T 29/49071; Y10T 428/24917; Y10T 428/294
See application file for complete search history.

(56) References Cited

U.S. PATENT DOCUMENTS

2013/0324414 A1* 12/2013 Solovyov ............ H01L 39/2451
                                                                                 252/519.1
2019/0371500 A1* 12/2019 Motoki ................. H01L 39/126

FOREIGN PATENT DOCUMENTS

| CN | 101714429 B | 6/2011 |
| CN | 103440932 B | 1/2016 |
| WO | WO9728557 | * 8/1997 |

OTHER PUBLICATIONS

CN103440932 [machine's translation] (Year: 2016).*

* cited by examiner

Primary Examiner — Tony Tran

(57) ABSTRACT

A method for improving current carrying capacity of a second-generation high-temperature superconducting tape, which includes: stretching the second-generation high-temperature superconducting tape in a high-temperature environment, and carrying out an oxygenation heat treatment on the stretched second-generation high-temperature superconducting tape The atmosphere of the high-temperature environment is oxygen, or an inert gas, or a mixture thereof, and a temperature of the high-temperature environment is 450-650° C.; and a strain for stretching ranges from 0.1% to 1%, and a time for stretching ranges from 1 minute to 100 hours. The method of the present invention is a post-processing technique for the second-generation high-temperature superconducting tape with a simple treatment process and a controllable result, and by stretching, current carrying capacity of the superconducting tape is improved and anisotropy of superconductivity is reduced.

3 Claims, 2 Drawing Sheets

METHOD FOR IMPROVING CURRENT CARRYING CAPACITY OF SECOND-GENERATION HIGH-TEMPERATURE SUPERCONDUCTING TAPE

CROSS-REFERENCE TO RELATED APPLICATIONS

This application claims the benefit of priority from Chinese Patent Application No. CN201811578088.X, filed on Dec. 21, 2018. The content of the aforementioned application, including any intervening amendments thereto, is incorporated herein by reference in its entirety.

TECHNICAL FIELD

The present application relates to the preparation of second-generation high-temperature superconducting materials, and more particularly to a method for improving current carrying capacity of second-generation high-temperature superconducting tapes.

BACKGROUND OF THE INVENTION

With high critical transition temperature, high current carrying capacity and high irreversible field, the second-generation high-temperature superconducting tape, a practical superconducting material, can be used in a wide range of temperatures and applied magnetic fields. In order to meet the needs of different applications, the improvement of the current carrying density and the reduction of the anisotropy of superconductivity of the second-generation high-temperature superconducting tape have become the research focus in the art. By far, there are two main technical solutions. The first method is to introduce a non-superconducting second phase as magnetic flux pinning center during the deposition of the superconducting layer (in-situ deposition or ex-situ deposition). The second method is to introduce some defects as magnetic flux pinning centers by applying a fast neutron radiation on the second-generation high-temperature superconducting tape to improve the current carrying capacity. Though the former has been extensively studied, the content of the second phase and the control of the distribution and geometry of the second phase still needs to be further improved to increase the current carrying capacity of the second-generation high-temperature superconducting tape; and the latter is limited by the technical conditions that the production scale cannot be guaranteed. Therefore, a simple and operable method for improving the current carrying capacity of the second-generation high-temperature superconducting tape is of great importance.

SUMMARY OF THE INVENTION

A method for improving current carrying capacity of second-generation high-temperature superconducting tapes is provided by the present invention targeting the deficiencies in the prior art, which can significantly improve the current carrying capacity of the second-generation high-temperature superconducting tape and reduce the anisotropy of the superconductivity. A preparation technique of the second-generation high-temperature superconducting tape can be a pulse laser deposition, a chemical vapor deposition, or a chemical solution deposition, etc.; a composition of a superconducting layer could be a rare-earth barium-copper-oxide compound or a rare-earth barium-copper-oxide compound containing a non-superconducting second phase; and the industrial production can be realized with a simple and controllable stretching process and low requirement for equipment accuracy.

Provided is a method for improving current carrying capacity of a second-generation high-temperature superconducting tape, comprising:

stretching the second-generation high-temperature superconducting tape in a high-temperature environment; and carrying out oxygenation heat treatment on the stretched second-generation high-temperature superconducting tape.

Preferably, the second-generation high-temperature superconducting tape is plated with or without silver.

Preferably, a superconducting layer of the second-generation high-temperature superconducting tape comprises a rare-earth barium-copper-oxide compound or a rare-earth barium-copper-oxide compound containing a non-superconducting second phase.

Preferably, the preparation technique for the superconducting layer of the second-generation high-temperature superconducting tape comprises a pulsed laser deposition, a chemical vapor deposition and a chemical solution deposition.

Preferably, an atmosphere of the high-temperature environment is oxygen, or an inert gas, or a mixture thereof; and a temperature of the high-temperature environment is 450-650° C.

Preferably, a strain for stretching ranges from 0.1% to 1%, and a time for stretching ranges from 1 minute to 100 hours.

Preferably, the oxygenation heat treatment comprises holding the second-generation high-temperature superconducting tape in a pure oxygen atmosphere at 400-500° C. for 30 minutes to 5 hours.

Generally, it is known that the superconducting layer will delaminate or crack macroscopically when the stress and strain exceeds the allowable range, and such mechanical damage will cause different attenuation degrees of the current carrying capacity. A "reconstruction" of the microstructure of the superconducting layer induced by the stress and strain under a high-temperature environment, which is to increase the defect density of the superconducting layer comprising dislocation loops, stacking faults, etc. with a strain, is provided by the present invention, so that unexpected technical effects can be achieved. Due to the positive correlation between the flux pinning ability and the defect density of the superconducting layer, the current carrying density of the second-generation high-temperature superconducting tape is greatly improved and anisotropy of superconductivity is reduced by the stretching strain. The stretched second-generation high-temperature superconducting tape needs to be subjected to the oxygenation heat treatment to ensure the enough amount of oxygen content in the superconducting layer as the oxygen loss may occur during stretching.

The present invention has the following beneficial effects.

1. The current carrying density of the second-generation high-temperature superconducting tape is greatly improved and the anisotropy of superconductivity is reduced by stretching.

2. The present invention is not sensitive to the composition and preparation techniques of the superconducting layer of the second-generation high-temperature superconducting tape.

3. The method of the present invention is a post-processing technology for the second-generation high-temperature superconducting tape with a simple treatment process and a controllable result, which can meet the needs of mass industrial production.

BRIEF DESCRIPTION OF THE DRAWINGS

The features, objects, and advantages of the present invention will become more apparent with reference to the detailed description of non-limiting embodiments and the drawings.

DETAILED DESCRIPTION OF EMBODIMENTS

The present invention will now be described in detail with reference to the following embodiments which are illustrative rather than limiting. It should be noted that changes and modifications made by the skilled in the art, without departing from the inventive concept, are within the scope of the present invention.

The embodiments are directed to a method for improving current carrying capacity of second-generation high-temperature superconducting tapes, comprising stretching a second-generation high-temperature superconducting tape plated with or without silver in a high-temperature environment of 450-650° C. such that a strain of 0.1-1% along the length of the superconducting tape is further caused and is maintained for 1 minute to 100 hours; and the atmosphere of the high-temperature atmosphere can be oxygen, a protective inert atmosphere, or a mixture thereof. After stretching, an oxygenation heat treatment is carried out on superconducting tape, that is, the second-generation high-temperature superconducting tape is held in a pure oxygen atmosphere at 400-500° C. for 30 minutes to 5 hours. With the preferred high-temperature stretching process, the current carrying capacity of the second-generation high-temperature superconducting tape can be increased by 30%.

Example 1

In this embodiment, illustrated is a method for improving the current carrying capacity of a second-generation high-temperature superconducting tape, which comprises the following steps.

1) Selection of a material and a preparation technique for the superconducting layer.

The superconducting layer of the second-generation high-temperature superconducting tape is $EuBa_2Cu_3O_7$ deposited by pulsed laser deposition, and the superconducting tape is plated without silver.

2) Stretching under high-temperature environment

The material selected in step 1) is stretched in an oxygen atmosphere under a high-temperature environment of 650° C. such that a strain of 1% along the length of the second-generation high-temperature superconducting tape is caused and maintained for 1 minute.

3) Silver plating and oxygenation heat treatment After stretching under the high-temperature, the second-generation high-temperature superconducting tape is plated with silver, and then the silver-plated superconducting tape is held in a pure oxygen atmosphere at 500° C. for 30 minutes.

Figure 1:
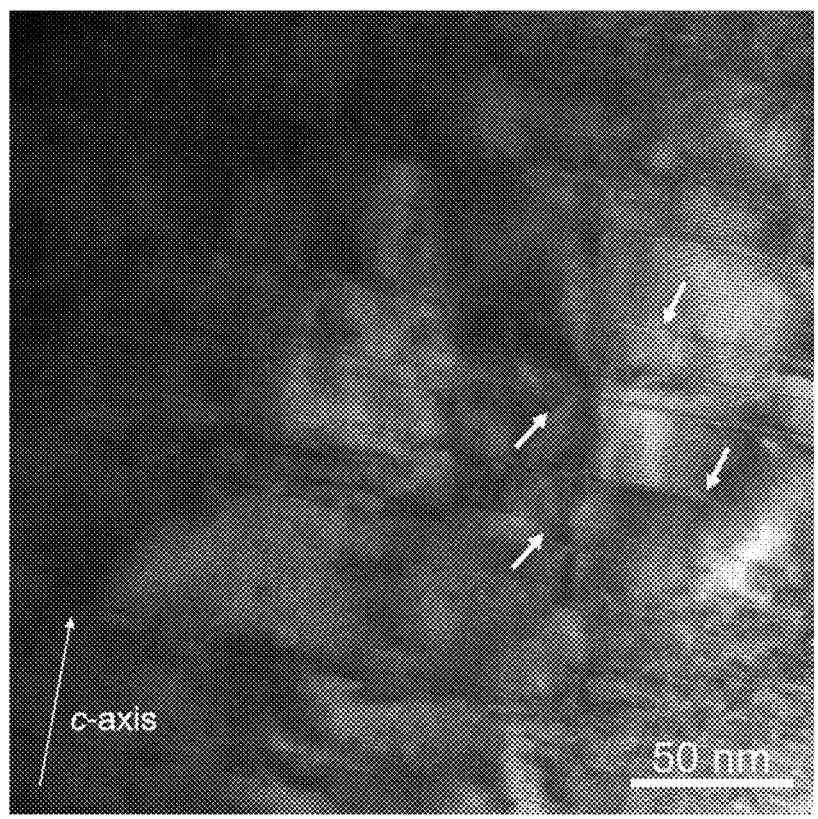
FIG. 1 is a transmission electron micrograph of a cross-section of a superconducting layer in a second-generation high-temperature superconducting tape according to a first embodiment, in which a growth direction of c-axis of a superconducting layer $EuBa_2Cu_3O_7$ and a position of a stacking fault are marked.
Figure 2:
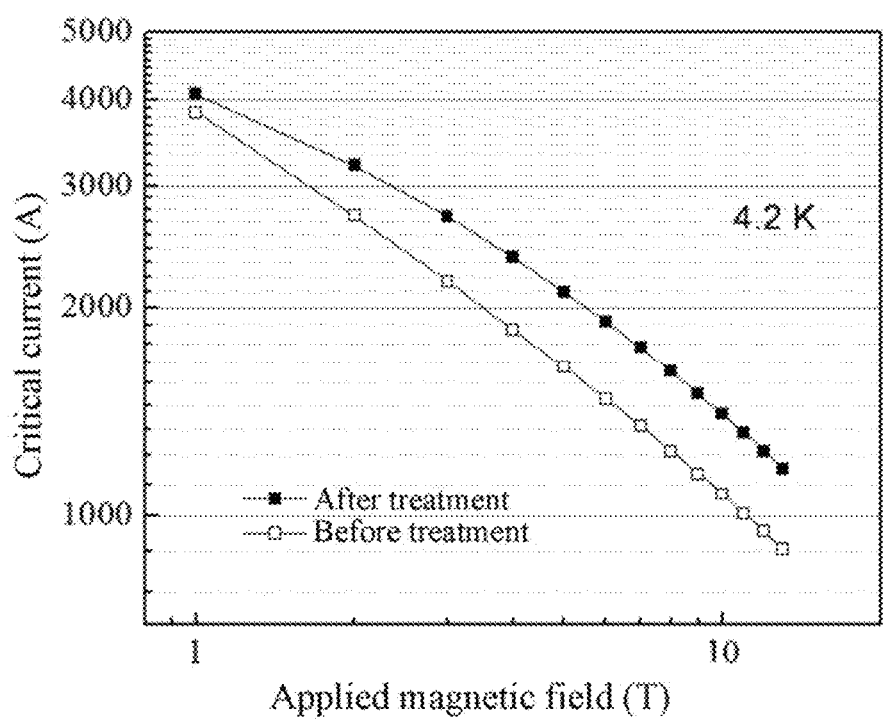
FIG. 2 is a critical current-external field graph of the second-generation high-temperature superconducting tape at a temperature of 4.2 K before and after the high-temperature stretching and heat treatment according to the first embodiment, in which the applied magnetic field is perpendicular to a surface of the superconducting tape.
Figure 3:
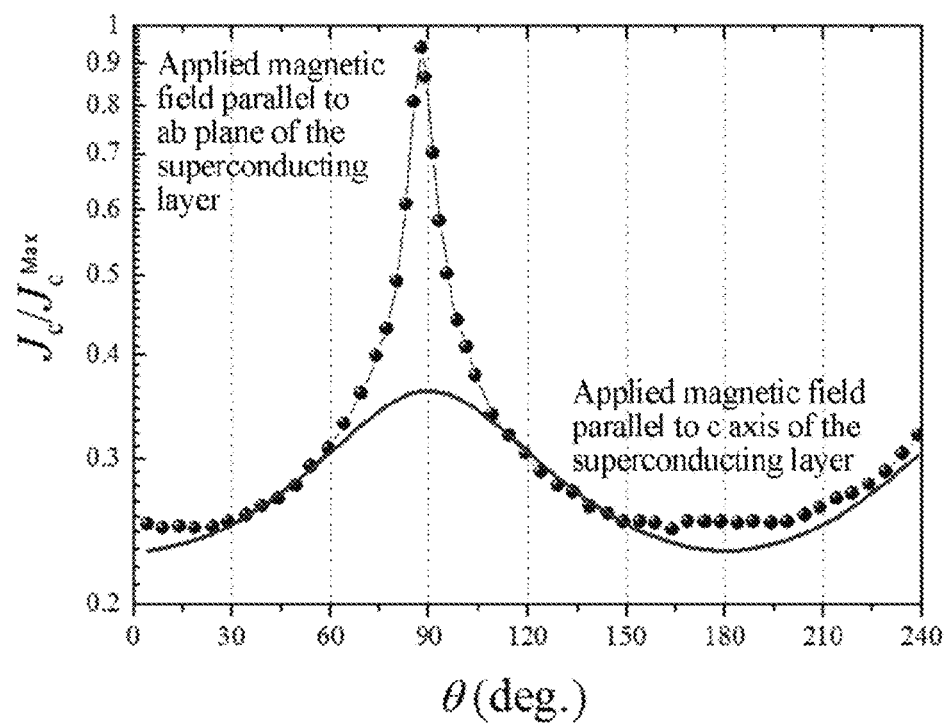
FIG. 3 is a graph showing a calculated anisotropy of the second-generation high-temperature superconducting tape after the high-temperature stretching and heat treatment according to the first embodiment.

The transmission electron micrograph of the cross-section of the superconducting layer of the second-generation high-temperature superconducting tape of the embodiment is shown in FIG. 1, in which the growth direction of c-axis of the superconducting layer $EuBa_2Cu_3O_7$ and the position of the stacking fault are marked. After the heat treatment, a critical current of the superconducting tape of the embodiment is reached to 1400 A/cm-width under conditions of 4.2 K and 10 T, which is increased by 30%, and the anisotropy is reduced to 4 (shown in FIGS. 2, 3).

Example 2

In this embodiment, illustrated is a method for improving the current carrying capacity of the second-generation high-temperature superconducting tape which comprises the following steps.

1) Selection of a material and preparation technique for the superconducting layer The superconducting layer of the second-generation high-temperature superconducting tape is $YBa_2Cu_3O_7+BaZrO_3$ deposited by pulsed laser deposition, and the superconducting tape is plated with silver.

2) Stretching under high-temperature environment

The material selected in step 1) is stretched in a nitrogen atmosphere under a high-temperature environment of 550° C. such that a strain of 0.5% along the length of the second-generation high-temperature superconducting tape is caused and maintained for 5 hours.

3) Silver plating and oxygenation heat treatment

Figure 4:
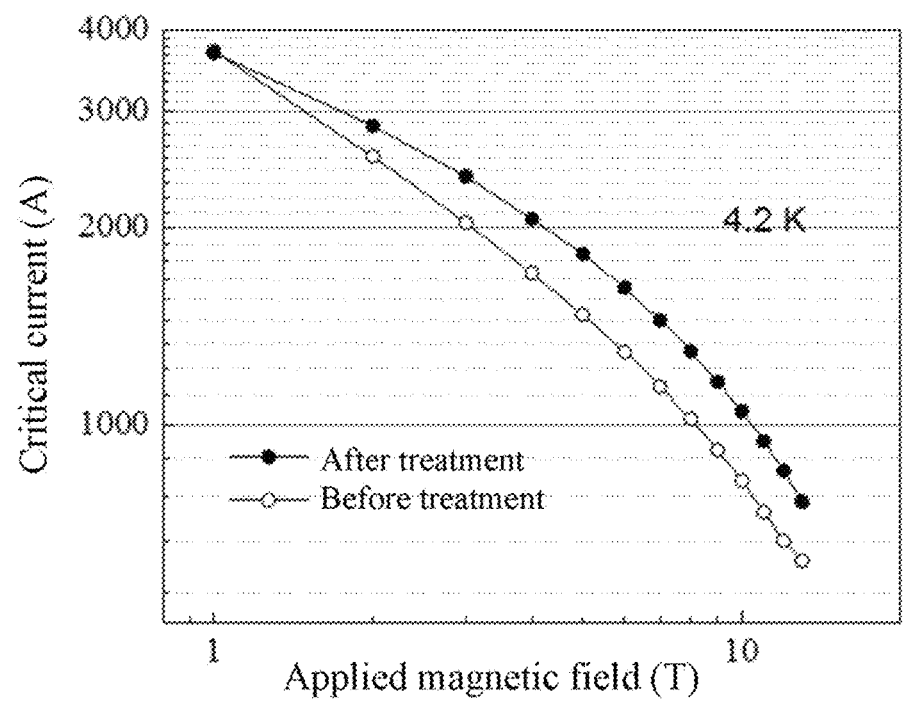
FIG. 4 is a critical current-external field graph of a second-generation high-temperature superconducting tape at a temperature of 4.2 K before and after the high-temperature stretching and heat treatment according to a second embodiment, in which the applied magnetic field is perpendicular to the surface of the superconducting tape.

The second-generation high-temperature superconducting tape obtained in step 2) is held in a pure oxygen atmosphere at 400° C. for 30 minutes to carry out the oxygenation heat treatment. As shown in FIG. 4, after the heat treatment, the critical current of the second-generation high-temperature superconducting tape is reached to 1000 A/cm-width under conditions of 4.2 K and 10 T, which is increased by 20%, and the anisotropy is reduced to 3.

Example 3

In this embodiment, illustrated is a method for improving the current carrying capacity of the second-generation high-temperature superconducting tape which comprises the following steps.

1) Selection of a material and a preparation technique for the super-conducting layer The superconducting layer of the second-generation high-temperature superconducting tape is $Y_{0.6}Gd_{0.6}Ba_2Cu_3O_7$ deposited by chemical vapor deposition, and the superconducting tape is plated with silver.

2) Stretching under high-temperature environment high-temperature

The material selected in step 1) is stretched in a high-temperature environment of 450° C. such that a strain of 0.1% along the length of the second-generation high-temperature superconducting tape is caused and maintained for 10 hours, and a mixture of oxygen and nitrogen with the volume ratio of 1:1 is the atmosphere of the high-temperature environment.

3) Silver plating and oxygenation heat treatment

The superconducting tape obtained in step 2) is held in a pure oxygen atmosphere at 500° C. for 30 minutes to 5 hours to carry out the oxygenation heat treatment. As shown in FIG. 4, after the heat treatment, the critical current of the second-generation high-temperature superconducting tape is reached to 1200 A/cm-width under conditions of 4.2 K and 10 T, which is increased by 10%, and the anisotropy is reduced to 3.

Example 4

In this embodiment, illustrated is a method for improving the current carrying capacity of the second-generation high-temperature superconducting tape which comprises the following steps:

1) Selection of a material and a preparation technique for the super-conducting layer The superconducting layer of the second-generation high-temperature superconducting tape is $GdBa_2Cu_3O_7+BaSnO_3$ deposited by chemical solution deposition, and the super-conducting tape is plated with silver;

2) Stretching under high-temperature environment high-temperature

The material selected in step 1) is stretched in an Ar atmosphere under a high-temperature environment of 450° C. such that a strain of 0.1% along the length of the second-generation high-temperature superconducting tape is caused and maintained for 10 hours.

3) Silver plating and oxygenation heat treatment

The second-generation high-temperature superconducting tape obtained in step 2) is held in a pure oxygen atmosphere at 500° C. for 30 minutes to 5 hours to carry out the oxygenation heat treatment. As shown in FIG. 4, after the heat treatment, the critical current of the superconducting tape is reached to 1000 A/cm-width under conditions of 4.2 K and 10 T, which is increased by 30%, and the anisotropy is reduced to 3.

Comparative Example 1

The embodiment relates to a method for improving the current carrying capacity of the second-generation high-temperature superconducting tape, and the method of the embodiment is similar to that of the first embodiment, except that the superconducting tape is plated with silver and copper in step 1).

After the treatments, the critical current of the obtained second-generation high-temperature superconducting tape is reduced to 500 A/cm-width under conditions of 4.2 K and 10 T.

Comparative Example 2

The embodiment relates to a method for improving the current carrying capacity of the second-generation high-temperature superconducting tape, and the method of the embodiment is similar to that of the first embodiment, except that in step 1) of the embodiment, the second-generation high-temperature superconducting tape is plated with silver and copper, and is laminated with stainless steel.

After the treatments, the critical current of the obtained second-generation high-temperature superconducting tape is reduced to 200 A/cm-width under conditions of 4.2 K and 10 T.

Comparative Example 3

The embodiment relates to a method for improving the current carrying capacity of the second-generation high-temperature superconducting tape, and the method of the embodiment is similar to that of the first embodiment, except that in step 2), the strain caused along the length of the second-generation high-temperature superconducting tape is of 0.01%.

After the treatments, no change is brought to the current carrying current of the second-generation high-temperature superconducting tape.

Comparative Example 4

The embodiment relates to a method for improving the current carrying capacity of the second-generation high-temperature superconducting tape, and the method of the embodiment is similar to that of the first embodiment, except that in step 2), the strain caused along the length of the second-generation high-temperature superconducting tape is of 5%.

After treatment, the critical current of the obtained second-generation high-temperature superconducting tape is reduced to 0 A/cm-width under conditions of 4.2 K and 10 T.

In conclusion, the high-temperature stretching process used in the present invention can significantly improve the current carrying capacity of the superconducting tape and reduce the anisotropy of superconductivity. The present invention is not sensitive to the composition and preparation process of the superconducting layer of the second-generation high-temperature superconducting tape. The present invention is a post-processing technology for the second-generation high-temperature superconducting tape with a simple treatment process and a controllable result that can meet the needs of mass industrial production.

Although the above illustrates some embodiments of the present invention, it should be understood that the present invention is not limited to the embodiments described above, and various changes or modifications may be made by those skilled in the art without departing from the scope of the invention. Any embodiments and features thereof may be combined with each other in a reasonable fashion.

We claim:

1. A method for improving a current carrying capacity of a second-generation high-temperature superconducting tape, the second-generation high-temperature superconducting tape comprising a superconducting layer, the method comprising the following steps in a sequential manner:
 a) depositing the superconducting layer by pulsed laser deposition, chemical vapor deposition, or chemical solution deposition to prepare the second-generation high-temperature superconducting tape,
  wherein the second-generation high-temperature superconducting tape is plated with silver, and
  the superconducting layer of the second-generation high-temperature superconducting tape comprises a rare-earth barium-copper-oxide compound or a rare-earth barium-copper-oxide compound containing a non-superconducting second phase;

b) stretching the second-generation high-temperature superconducting tape at 450-650° C. to produce a stretched second-generation high-temperature superconducting tape with a strain of 0.1-1% along a length thereof; and c) carrying out oxygenation heat treatment on the stretched second-generation high-temperature superconducting tape.

2. The method of claim 1, wherein an atmosphere in the high-temperature environment is oxygen, or an inert gas, or a mixture thereof.

3. The method of claim 1, wherein the oxygenation heat treatment comprises:

keeping the second-generation high-temperature superconducting tape in a pure oxygen atmosphere at 400-500° C. for 30 minutes to 5 hours.

\* \* \* \* \*